Dec. 27, 1949     S. I. MacDUFF     2,492,649
ACTUATOR FOR DIRIGIBLE WHEELS

Filed April 14, 1947     2 Sheets-Sheet 1

INVENTOR.
STANLEY I. MAC DUFF
BY
ATTORNEY

Dec. 27, 1949     S. I. MacDUFF     2,492,649
ACTUATOR FOR DIRIGIBLE WHEELS

Filed April 14, 1947     2 Sheets-Sheet 2

INVENTOR.
STANLEY I. MAC DUFF
BY
Cecil J Arens
ATTORNEY

Patented Dec. 27, 1949

2,492,649

UNITED STATES PATENT OFFICE 2,492,649

ACTUATOR FOR DIRIGIBLE WHEELS

Stanley I. MacDuff, South Bend, Ind., assignor to Bendix Aviation Corporation, South Bend, Ind., a corporation of Delaware Application April 14, 1947, Serial No. 741,181

3 Claims. (Cl. 244—50)

This invention relates to actuating devices for dirigible wheels and more particularly to an actuating device for the nose wheel of an aircraft.

An important object of the invention resides in the provision of an actuator carried by a landing gear and remotely controlled for hydraulically steering a wheel mounted thereon.

It is a further object of the invention to provide an actuator including a hydraulic motor associated therewith so constituted that the load on the piston of the motor is carried by a bearing slidable with the piston.

It is an object of the invention to provide an actuator for steering the nose wheel of an aircraft, which actuator comprises two cylinders mounted with their axes at right angles and having a rack and sector therein for imparting motion to said wheel.

The above and other objects and features of the invention will be apparent from the following description of the apparatus taken in connection with the accompanying drawings which form a part of this specification, and in which:

Figure 4 is a view in isometric of the cylinders of the actuator before assembling.

Figure 1:
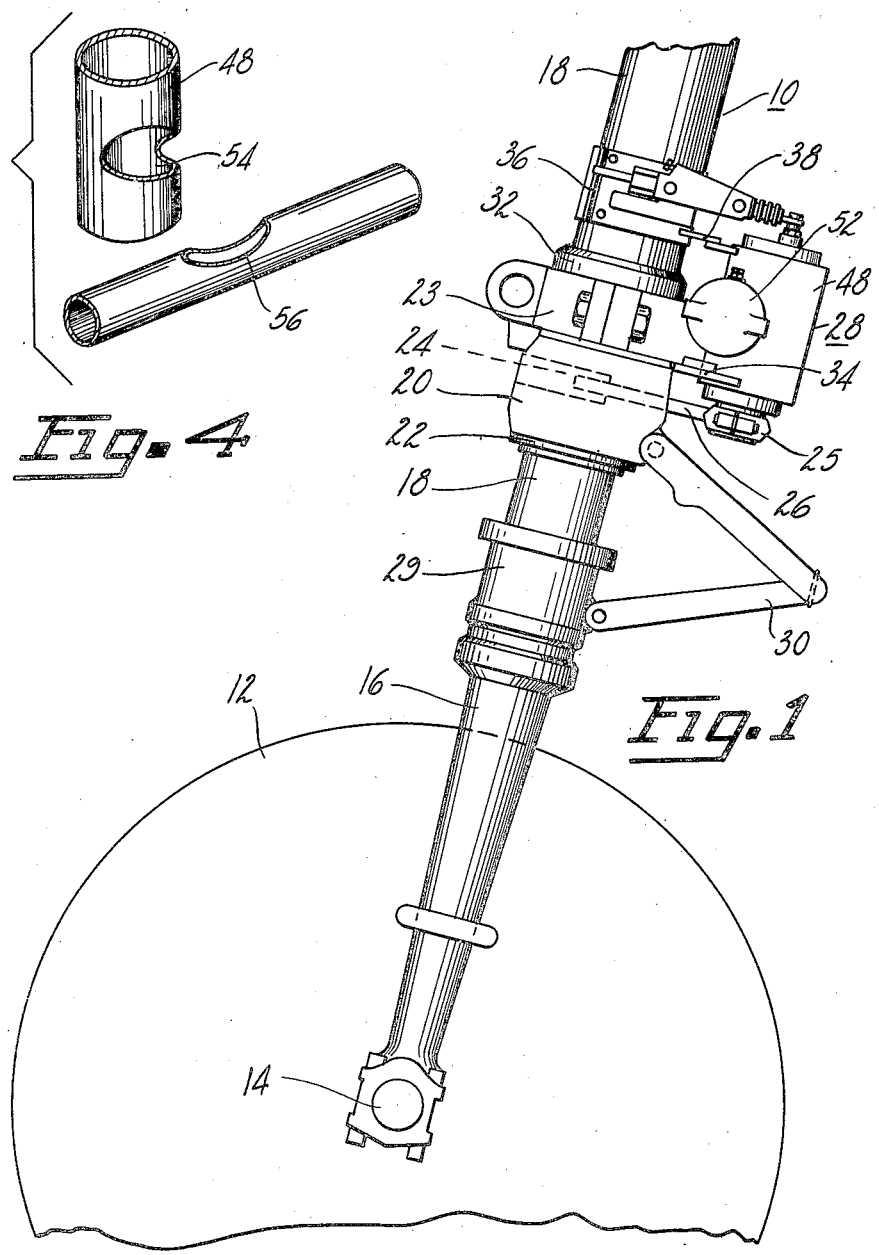
Figure 1 is a view of the device of the invention mounted on a shock strut for guiding the nose wheel thereof.

Referring to Figure 1 of the drawings, reference numeral 10 designates a shock strut or landing gear of conventional design on which a wheel 12 is mounted for steering an aircraft, not shown. The wheel is mounted for rotation on an axle 14 integral with a tube 16 which telescopes into a larger tube 18. The inner tube 16 slides and rotates freely in the outer or larger tube 18 to permit pivoting about an axis normal to the wheel axle for steering. A collar 20 fits over one end of the outer tube 18 and bears at one end on a flange 22 integral therewith. At its other end the collar bears against a fitting 23 which is securely keyed to the tube and held against axial movement by nut 32. The collar is free to rotate around the outer tube and is formed with a lever 24 to which is connected one end of a link 26, the other end of which is connected to a lever 25 of an actuator 28 for imparting rotation to the collar. A second collar 29 is fixed to the inner tube 16. A scissors lever 30 connects the rotatable collar 20 with the collar 29 which is fixed to the inner tube 16, to thereby permit axial movement of the tubes with respect to each other and to provide for rotation of the inner tube through rotation of the collar 20. The fitting 23 supports the actuator 28 through a bracket 34. A clamp 36 is secured to the outer tube 18 and supports the actuator through a bracket 38.

Figure 2:
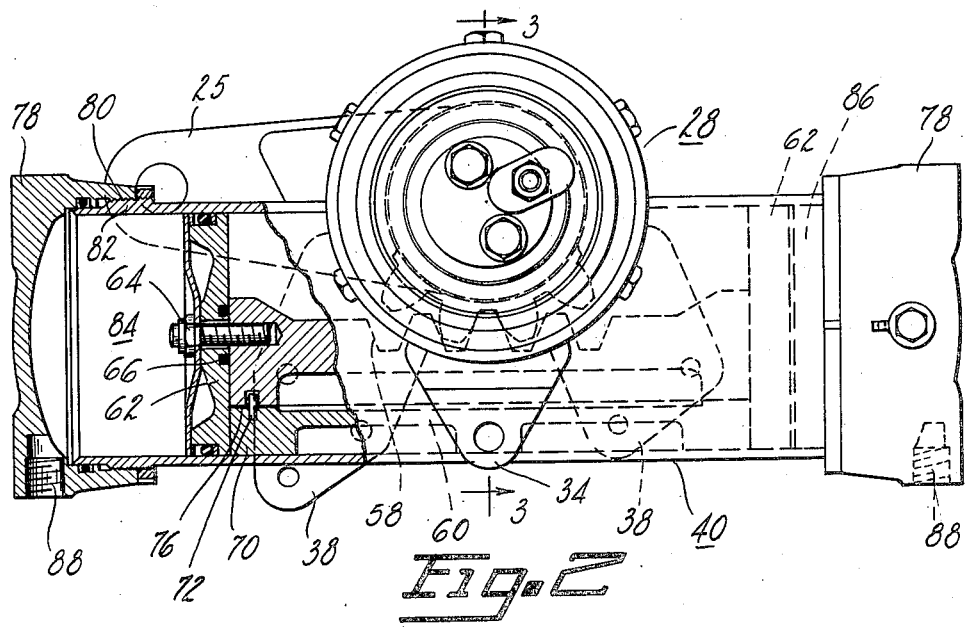
Figure 2 is a view of the device of the invention with its associated hydraulic motor shown partly in longitudinal section.
Figure 3:
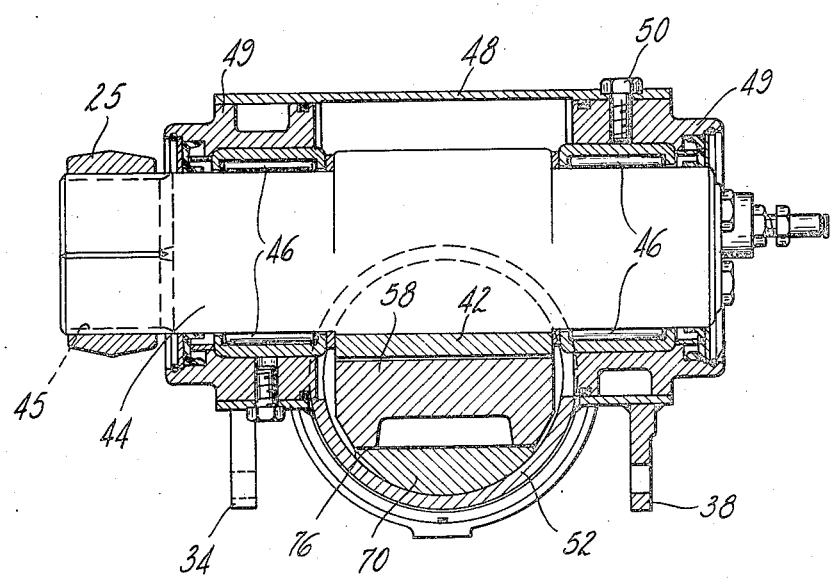
Figure 3 is a transverse sectional view of the device taken on the lines 3—3 of Figure 2.

As best shown in Figures 2 and 3, the actuator 28 is of unitary construction and comprises a hydraulic motor 40 drivably connected to a sector 42 splined or otherwise securely fastened to shaft 44. The shaft is splined on one end at 45 to receive one end of the link 26, and is rotatably supported in roller bearings 46 disposed in each end of a cylinder 48. The bearings are pressed into supporting rings 49 which are held in position in the ends of the cylinder by screws 50 which threadedly engage the rings.

The hydraulic motor includes a cylinder 52 having its axis at right angles to the axis of cylinder 48. These cylinders may be made from steel tubing processed to the proper size. The walls of the cylinders 48 and 52 have openings 54 and 56 respectively, therein, which are in registry when the cylinders are in assembled relationship. Cylinder 48 is so mounted that its axis is substantially parallel to the axes of tubes 16 and 18 and the axis of cylinder 52 is substantially at right angles to the axes of the tubes. The opening 54 receives the sector 42 which engages a rack 58 disposed in the motor cylinder 52 and carried by piston 60 having ends 62 secured to the rack by studs 64 and provided with sealing rings 66. The reaction on the piston from the load on the gear sector is transferred through the rack 58 to a bearing member 70 interposed between the piston ends and keyed to the rack by pins 72. As best seen in Figure 3 the bearing is configured to conform with the interior of the cylinder 52 to thereby provide adequate bearing surface to minimize the unit bearing load. The bearing fit is controlled by inserting shims 76 between the rack and the bearing. This also controls the backlash between the gears of the sector and the rack. End members 78 are interiorly threaded at 80 to engage threaded portions 82 of the cylinder 52 to form end chambers 84, 86 in the hydraulic motor 40 into which fluid under pressure is admitted through ports 88 of the end members.

The admission of fluid under pressure to one of the chambers and simultaneously exhausting fluid from the other chambers moves piston 60 and in so doing imparts rotative motion to shaft 44 through the sector 42. Rotation of the shaft 44 rotates the collar 20 through the crank arm 26 to thereby rotate the inner tube 16 about its axis to change the direction of wheel 12 to accomplish the desired steering.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. An actuator adapted to be mounted on a landing gear for imparting direction to a wheel thereof comprising a pair of cylinders each having an opening in the wall thereof and arranged in assembled relationship so that their axes are at right angles and the openings are in registry, a shaft rotatably disposed in one of the cylinders and adapted to be connected to the wheel to guide the same in a predetermined direction, a gear sector mounted on the shaft for rotation therewith and having a portion extending through said openings into the other cylinder, a piston in said other cylinder having a rack thereon in driving engagement with said gear sector, a bearing member carried by the piston and extending longitudinally thereof for sliding contact with said other cylinder to thereby transfer reaction from the piston into the cylinder, and means interposed between said bearing and piston for controlling the backlash between the rack and gear sector.

2. A mechanism for translating reciprocal motion into rotative motion comprising a unitary structure having a pair of tubes with their sides contiguous and their axes at right angles, said tubes provided with openings in their sides arranged for alignment, a shaft rotatably positioned in one of the tubes, a gear sector carried by the shaft and having a portion extending through said openings into the other tube, a piston in said other tube having a rack thereon in driving engagement with said gear sector, and an adjustable bearing member carried by the piston and interposed therebetween and said other cylinder for receiving the reaction of the gear sector.

3. An actuator adapted to be mounted on a landing gear for imparting direction to a wheel thereof comprising a pair of cylinders each having an opening in the wall thereof and arranged in assembled relationship so that their axes are at right angles and the openings are in registry, a shaft rotatably disposed in one of the cylinders and adapted to be connected to the wheel for guiding the same, a gear sector fixedly mounted on the shaft and having a portion extending through the openings into the other cylinder, a piston in said other cylinder having a rack thereon in driving engagement with said gear sector, a bearing for the piston constructed and arranged to slide therewith and adjustably mounted thereon, and shims interposed between said piston and bearing for positioning the bearing relative to said rack to adjust for backlash between said gear sector and rack.

STANLEY I. MacDUFF.

REFERENCES CITED

The following references are of record in the file of this patent:

UNITED STATES PATENTS

| Number | Name | Date |
| --- | --- | --- |
| 669,235 | Gardner | Mar. 5, 1901 |
| 719,562 | Brush | Feb. 3, 1903 |
| 815,266 | Cooper | Mar. 13, 1906 |
| 2,086,814 | McCollum | July 13, 1937 |
| 2,372,710 | Chisholm | Apr. 3, 1945 |